(12) United States Patent
Wei et al.

(10) Patent No.: US 8,346,002 B2
(45) Date of Patent: Jan. 1, 2013

(54) HIGH DYNAMIC RANGE IMAGE HALLUCINATION

(75) Inventors: Li-Yi Wei, Beijing (CN); Kun Zhou, Beijing (CN); Baining Guo, Beijing (CN); Heung-Yeung Shum, Beijing (CN); Lvdi Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1255 days.

(21) Appl. No.: 11/781,227

(22) Filed: Jul. 20, 2007

(65) Prior Publication Data

US 2009/0022414 A1  Jan. 22, 2009

(51) Int. Cl.
*G06K 9/00* (2006.01)
(52) U.S. Cl. ......................................... 382/254; 382/239
(58) Field of Classification Search ................... 382/254
See application file for complete search history.

(56) References Cited

U.S. PATENT DOCUMENTS

| | | | |
|---|---|---|---|
| 4,636,845 A | | 1/1987 | Alkofer |
| 6,720,993 B1 * | | 4/2004 | Hwang et al. ............. 348/208.13 |
| 2003/0030639 A1 * | | 2/2003 | Ritter ............................. 345/426 |
| 2005/0030393 A1 * | | 2/2005 | Tull ............................... 348/241 |
| 2005/0084166 A1 * | | 4/2005 | Boneh et al. ................... 382/239 |
| 2005/0201634 A1 | | 9/2005 | Yuan et al. |
| 2005/0212955 A1 | | 9/2005 | Craig et al. |
| 2005/0220355 A1 * | | 10/2005 | Sun et al. ...................... 382/254 |
| 2005/0243176 A1 * | | 11/2005 | Wu et al. ...................... 348/207.1 |
| 2007/0025717 A1 | | 2/2007 | Raskar et al. |

OTHER PUBLICATIONS

International Search Report PCT/US2008/070579 mailed Feb. 4, 2009. 11 Pages.

Liu, et al., "A Two-Step Approach to Hallucinating Faces: Global Parametric Model and Local Nonparametric Model", IEEE Conf. Computer Vision and Pattern Recognition 2001, pp. 192-198.
Wang, et al., "High Dynamic Range Image Hallucination", Eurographics Symposium on Rendering (2007), May 23, 2007. 7 Pages.
Jian Sun et al. "Image Hallucination with Primal Sketch Priors", 2003 IEEE Computer Society Conference on Computer Vision and Pattern Recognition (CVPR '03), 2003, vol. 2.
Kui Jia et al. "Hallucinating Multiple Occluded CCTV Face Images of Different Resolutions", Pattern Recognition Letters, vol. 27, Issue 15, Nov. 2006, pp. 1768-1775.
G. Dedeoglu et al. "High-Zoom Video Hallucination by Exploiting Spatio-Temporal Regularities", Proceedings of the 2004 IEEE Computer Society Conference on Computer Vision and Pattern Recognition (CVPR '04), vol. 2, Jun. 2004, pp. 151-158.
Wei Liu et al. "Bayesian Tensor Inference for Sketch-based Facial Photo Hallucination", IJCAI 2007.
Ce Liu et al. "Face Hallucination: Theory and Practice", International Journal of Computer Vision (IJCV) 2007, An earlier version of this work was published at CVPR 2001.

* cited by examiner

Primary Examiner — Hadi Akhavannik
(74) Attorney, Agent, or Firm — Lee & Hayes, PLLC

(57) ABSTRACT

An apparatus and method provide for providing an output image from an input image. The input image may contain at least one portion that does not display certain desired information of the image, such as texture information. The desired information may be obtained from a second portion of the input image and applied to the at least one portion that does not contain the texture information or contains a diminished amount of the texture information. Also, at least one characteristic of the second portion of the input image may not be applied to the at least one portion such as illumination information. In another example, the input image may be decomposed into multiple parts such as a high frequency and a low frequency component. Each component may be hallucinated individually or independently and combined to form the output image.

20 Claims, 10 Drawing Sheets

HIGH DYNAMIC RANGE IMAGE HALLUCINATION

BACKGROUND

Image processing has gained importance over recent years. Despite the explosive growth of the use images, the overall quality of images typically cannot be guaranteed. An image may contain, for example, areas of low quality or areas of high quality imaging. In areas of low quality, the clarity or detail of the image may be insufficient for certain uses. For example, an overexposed or underexposed region in an image may result in the image becoming at least partially obscured such that detail in the image is no longer visible or poorly visible. This results in frustration for the user.

Thus, there is a need for a method or system for enhancing or improving image quality such that desired details are visible.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one example, an image may be modified to include texture information. For example, an image is received and decomposed into multiple parts. Each of the parts or components may be hallucinated independently or individually. The hallucinated components may be combined to generate an output image. The received image my contain portions that lack image information such as texture information. The output image may include the image information such as texture information in the corresponding portions.

In another example, texture information from a first portion of the image may be applied to a second portion of the image. Other image information from the first portion of the image may not be applied to the second portion of the image. For example, texture information from the first portion of the image may be applied to the second portion of the image while illumination information from the first portion of the image may not be applied to the second portion of the image.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples. Systems described herein are provided as examples and not limitations. As those skilled in the art will appreciate, the present examples are suitable for application in a variety of different types of computing systems.

Figure 1:
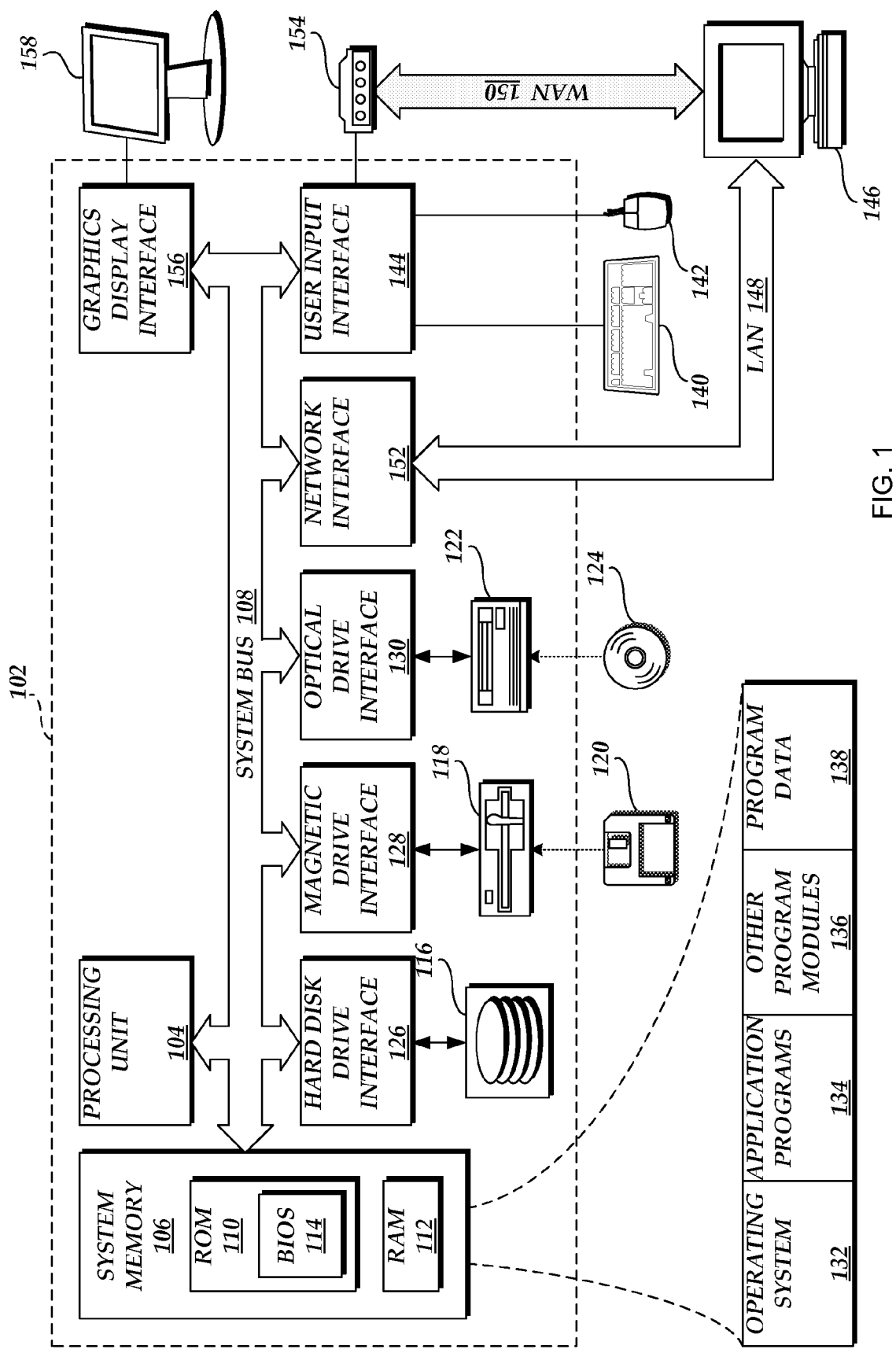
FIG. 1 illustrates an example of a suitable computing system environment.

FIG. 1 illustrates an example of a suitable computing system environment or architecture in which computing subsystems may provide processing functionality. The computing system environment is only one example of a suitable computing environment and is not intended to suggest any limitation as to the scope of use or functionality of the invention. Neither should the computing environment be interpreted as having any dependency or requirement relating to any one or combination of components illustrated in the exemplary operating environment.

The method or system disclosed herein is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The method or system may be described in the general context of computer-executable instructions, such as program modules, being executed by a computer. Generally, program modules include routines, programs, objects, components, data structures, etc. that perform particular tasks or implement particular abstract data types. The method or system may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the method or system includes a general purpose computing device in the form of a computer 102. Components of computer 102 may include, but are not limited to, a processing unit 104, a system memory 106, and a system bus 108 that couples various system components including the system memory to the processing unit 104. The system bus 108 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 102 typically includes a variety of computer readable media. Computer readable media can be any available media that can be accessed by computer 102 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 102. Combinations of the any of the above should also be included within the scope of computer readable storage media.

The system memory 106 includes computer storage media in the form of volatile and/or nonvolatile memory such as read only memory (ROM) 110 and random access memory (RAM) 112. A basic input/output system 114 (BIOS), containing the basic routines that help to transfer information between elements within computer 102, such as during start-up, is typically stored in ROM 110. RAM 112 typically contains data and/or program modules that are immediately accessible to and/or presently being operated on by processing unit 104. By way of example, and not limitation, FIG. 1 illustrates operating system 132, application programs 134, other program modules 136, and program data 138.

The computer 102 may also include other removable/non-removable, volatile/nonvolatile computer storage media. By way of example only, FIG. 1 illustrates a hard disk drive 116 that reads from or writes to non-removable, nonvolatile magnetic media, a magnetic disk drive 118 that reads from or writes to a removable, nonvolatile magnetic disk 120, and an optical disk drive 122 that reads from or writes to a removable, nonvolatile optical disk 124 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 116 is typically connected to the system bus 108 through a non-removable memory interface such as interface 126, and magnetic disk drive 118 and optical disk drive 122 are typically connected to the system bus 108 by a removable memory interface, such as interface 128 or 130.

The drives and their associated computer storage media discussed above and illustrated in FIG. 1, provide storage of computer readable instructions, data structures, program modules and other data for the computer 102. In FIG. 1, for example, hard disk drive 116 is illustrated as storing operating system 132, application programs 134, other program modules 136, and program data 138. Note that these components can either be the same as or different from additional operating systems, application programs, other program modules, and program data, for example, different copies of any of the elements. A user may enter commands and information into the computer 102 through input devices such as a keyboard 140 and pointing device 142, commonly referred to as a mouse, trackball or touch pad. Other input devices (not shown) may include a microphone, joystick, game pad, pen, scanner, or the like. These and other input devices are often connected to the processing unit 104 through a user input interface 144 that is coupled to the system bus, but may be connected by other interface and bus structures, such as a parallel port, game port or a universal serial bus (USB). A monitor 158 or other type of display device is also connected to the system bus 108 via an interface, such as a video interface or graphics display interface 156. In addition to the monitor 158, computers may also include other peripheral output devices such as speakers (not shown) and printer (not shown), which may be connected through an output peripheral interface (not shown).

The computer 102 may operate in a networked environment using logical connections to one or more remote computers, such as a remote computer. The remote computer may be a personal computer, a server, a router, a network PC, a peer device or other common network node, and typically includes many or all of the elements described above relative to the computer 102. The logical connections depicted in FIG. 1 include a local area network (LAN) 148 and a wide area network (WAN) 150, but may also include other networks. Such networking environments are commonplace in offices, enterprise-wide computer networks, intranets and the Internet.

When used in a LAN networking environment, the computer 102 is connected to the LAN 148 through a network interface or adapter 152. When used in a WAN networking environment, the computer 102 typically includes a modem 154 or other means for establishing communications over the WAN 150, such as the Internet. The modem 154, which may be internal or external, may be connected to the system bus 108 via the user input interface 144, or other appropriate mechanism. In a networked environment, program modules depicted relative to the computer 102, or portions thereof, may be stored in the remote memory storage device. By way of example, and not limitation, remote application programs may reside on a memory device. It will be appreciated that the network connections shown are exemplary and other means of establishing a communications link between the computers may be used.

In one example, high dynamic range details may be provided in an image in predetermined areas in the image. The high dynamic range details may be obtained from a variety of sources and may be applied to or added to areas on certain portions of the image. The portions of the image that receive the high dynamic range details may include, for example, underexposed areas or overexposed areas of the image. The high dynamic range details or texture information may be added to any of the underexposed areas or overexposed areas. In one example, the texture information may be transferred from a first area in the image to a second area of the image while at least one other characteristic of the first area is not transferred to the second area of the image.

The high dynamic range details or texture information may be obtained from an external source or from the image itself. In one example, a portion of an image may be selected for processing such that the image in the selected portion is enhanced. In this example, the selected portion of the image may be modified to include texture information. The texture information may be obtained from another portion of the image such as an unselected portion or an alternatively selected region of the image, or may be obtained from an external source. The texture information may be assigned to the selected portion of the image while other aspects of the selected portion of the image may be maintained without modification. For example, illumination properties of the selected portion of the image may be maintained such that the texture information may be added to the selected portion of the image while the illumination properties of the selected portion of the image remains substantially the same.

In one example, an image may be received and separated into multiple components. Each of the components of the image may be processed and combined to form a resulting image. The resulting image may contain additional information not contained in the original image. For example, the original image may contain a representation of a surface. The surface may have a certain surface characteristic such as a texture, however, the original image may lack the surface characteristic in at least one portion of the image. The surface characteristic or texture information lacking in the at least one portion of the image may be captured from a different source or a different portion of the image and may be applied to the at least one portion of the image. For example, the original image may contain a second portion containing an image of a second portion of the surface. The second portion of the surface as represented in the image may contain texture information of the surface. The texture information from the second portion of the surface may be applied to the at least one portion of the image such that the at least one portion of the image may receive the surface texture information and may apply the texture information to generate an image in which the at least one portion of the image contains the texture information from the second portion of the image.

Also in this example, at least one characteristic of the second portion of the image may not be applied to the at least one portion of the image. For example, an illumination characteristic of the at least one portion of the image may be different from a corresponding illumination characteristic of the second portion of the image. When the texture information of the surface in the second portion of the image is applied to the at least one portion of the image, the illumination characteristic of the second portion of the image is not applied to the at least one portion of the image. Instead, in this example, the at least one portion of the image retains the original illumination characteristic after the texture information from the second portion of the image is applied to the at least one portion of the image.

Also in this example, each of the components of the image may be processed as set forth above. In one example, a first component of the image may include a high frequency texture component of the image. The high frequency texture component may include, for example, high frequency texture data corresponding to the image. A second component may also be generated to include an illumination component, for example, a low frequency illumination component. The first component or the high frequency texture component may be constrained with texture synthesis in one example. Also, the low frequency illumination component may be hallucinated by Gaussian fitting. Each of the components may be combined to obtain high dynamic range image hallucination.

Figure 2:
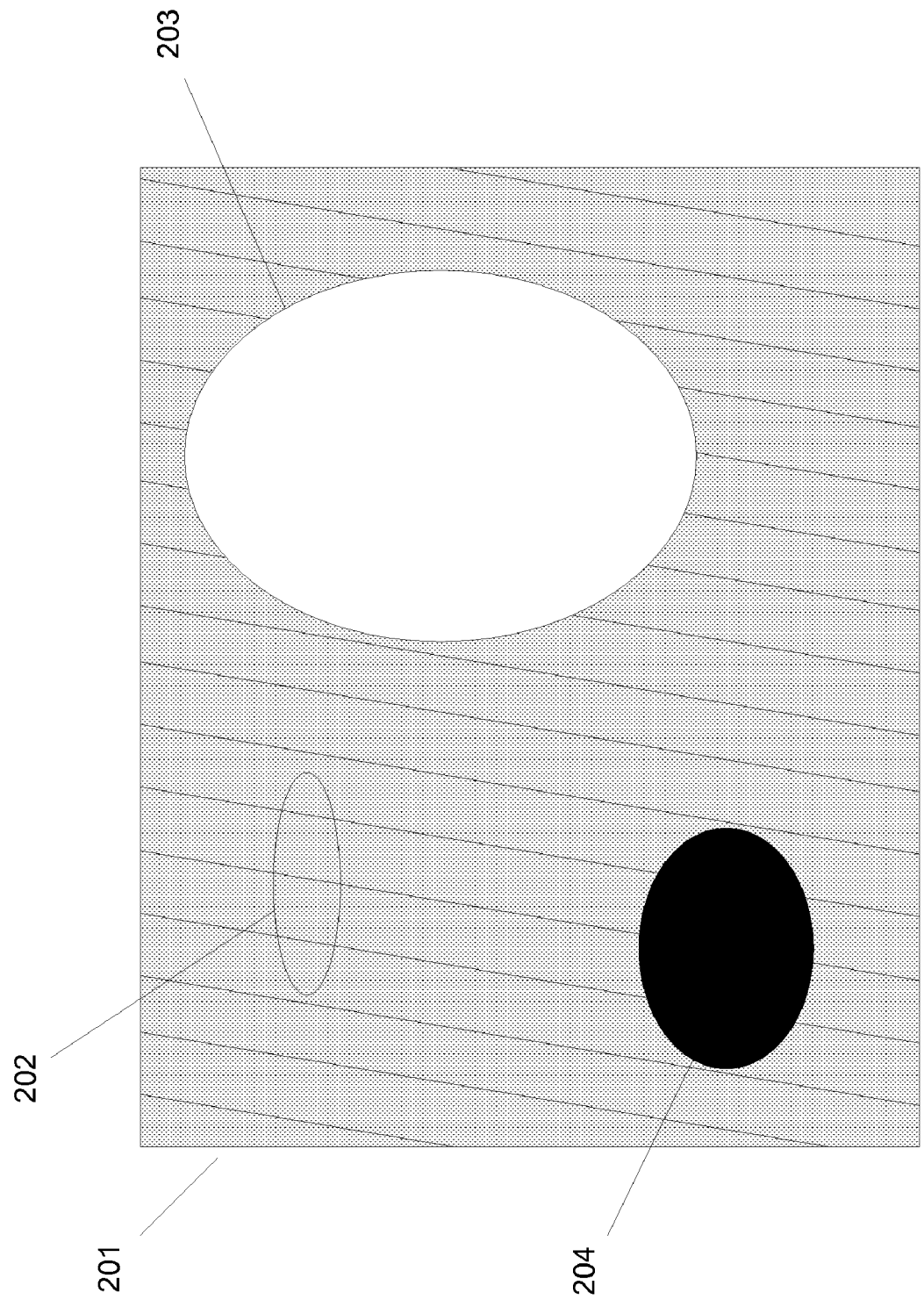
FIG. 2 illustrates an example of an image containing different regions.

In one example to illustrate, an image may contain different regions containing different exposures. FIG. 2 illustrates an example of an image containing different regions. Any of the regions of the image 201 may contain an image or portion of the image at a particular exposure level. The image 201 contains an underexposed region 204 and an overexposed region 203. In any of the underexposed region 204 and the overexposed region 203, texture data may not be visible. As illustrated in FIG. 2, the texture represented by diagonal lines is not visible in either overexposed region 203 or underexposed region 204. In region 202, the exposure is intermediate such that the texture is visible.

Figure 3:
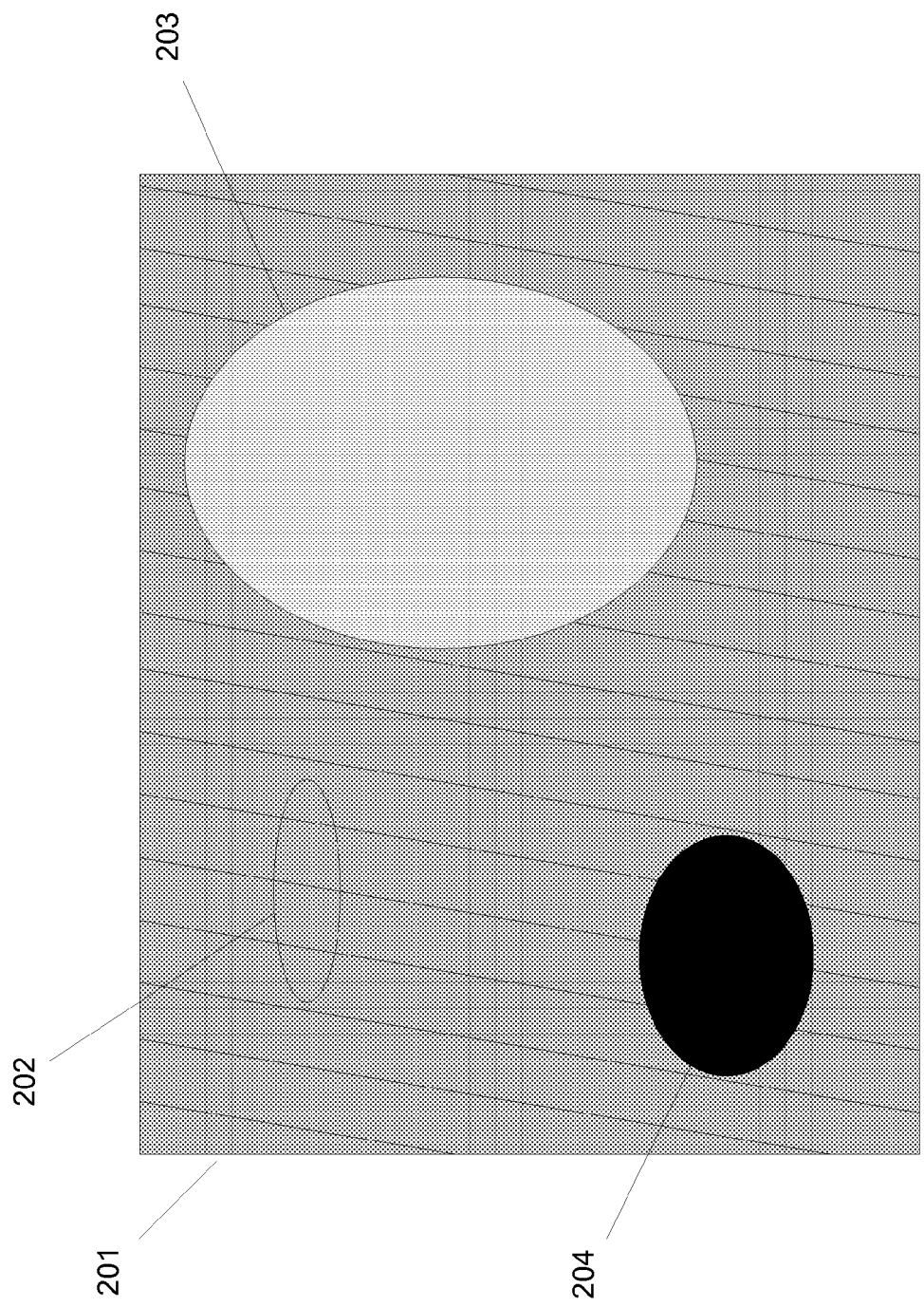
FIG. 3 illustrates an image after an illumination adjustment.

FIG. 3 illustrates the image of FIG. 2 after illumination adjustment. In this example, the illumination of the image 201 is decreased such that the image appears darker overall. The texture of the image is visible in portions of the image, for example, in region 202. However, the image 201 contains overexposed region 203 and underexposed region 204 which do not display the texture of the image. In this example, even after illumination adjustment, both the overexposed region 203 and the underexposed region 204 do not contain the texture of the image.

Figure 4:
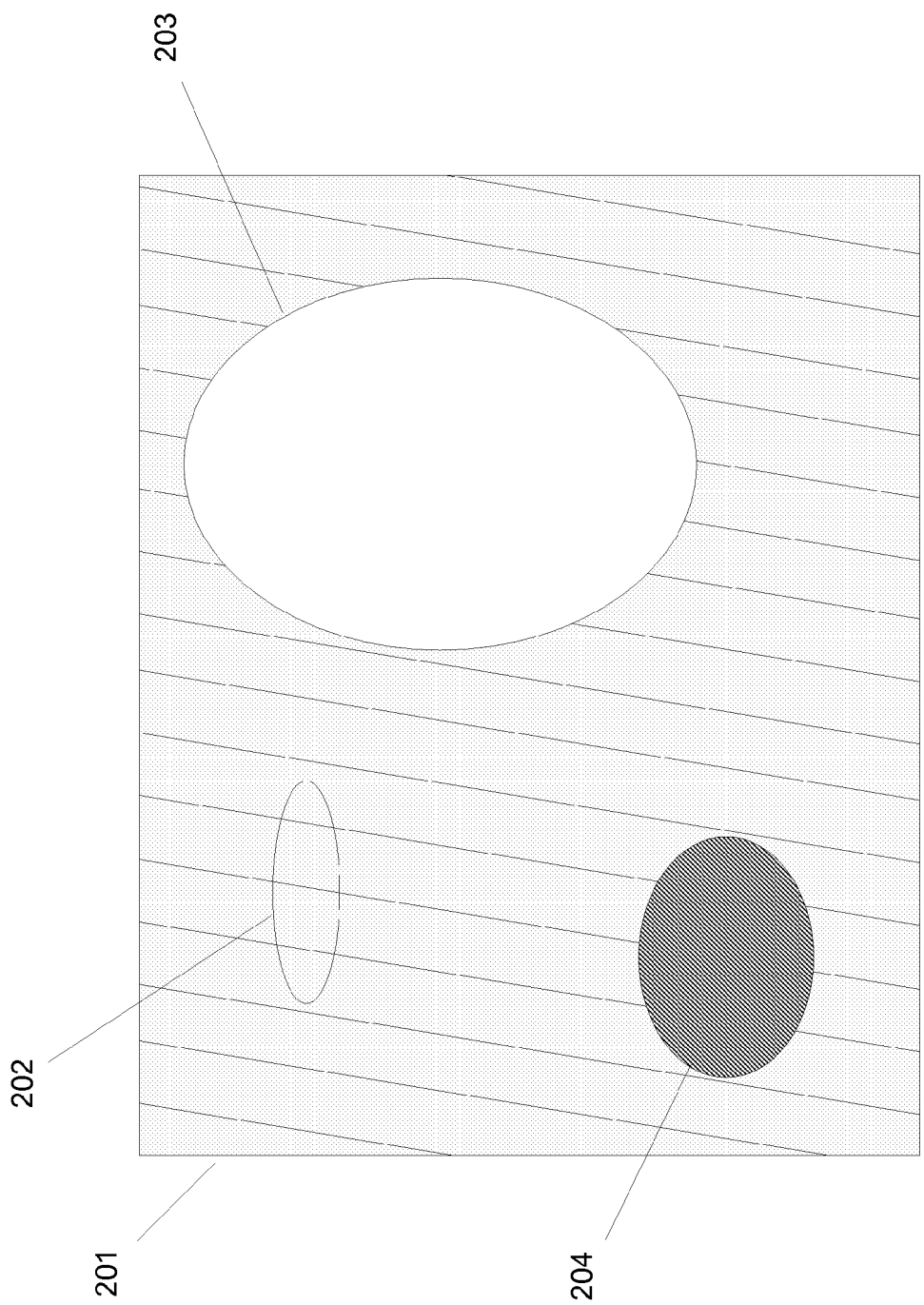
FIG. 4 illustrates another example of illumination adjustment of an image.

FIG. 4 illustrates the image of FIG. 2 after another adjustment of illumination of the image. In this example, the illumination of image 201 is increased such that the image 201 appears lighter. The texture of the image is visible in portions of the image as in the previous example (e.g., in region 202). However, the texture of the image is still not visible in either the overexposed region 203 or the underexposed region 204.

Figure 5:
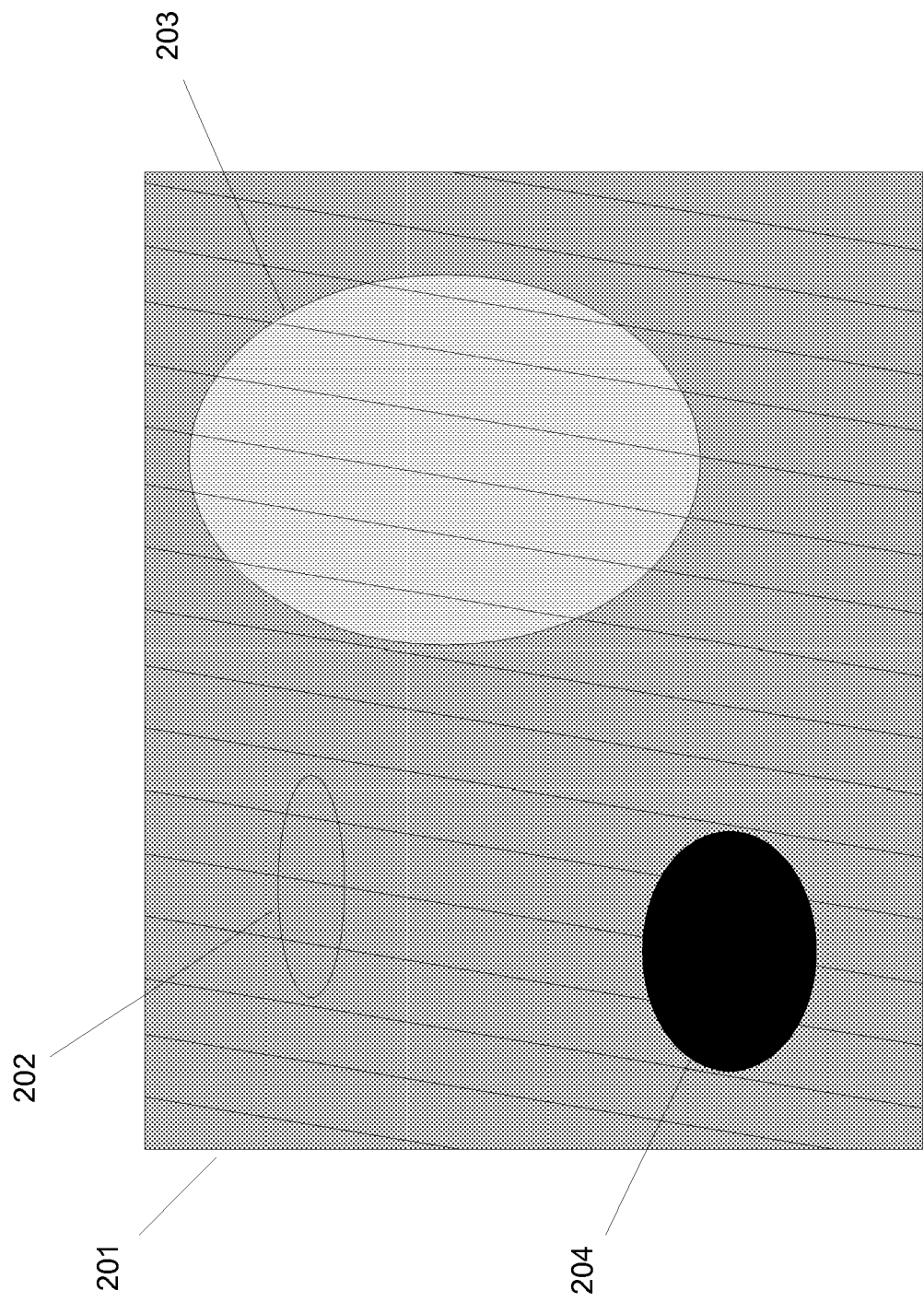
FIG. 5 illustrates an example of applying a texture of an image to an underexposed area or an overexposed area of the image.

The texture in one portion of the image may be applied to another portion of the image. FIG. 5 illustrates an example of applying the texture of the image to an underexposed area or an overexposed area of the image. As the example of FIG. 5 illustrates, texture information for the image from region 202 of the image may be applied to the overexposed region 203. The illumination is adjusted such that the overall darkness of the image 201 is increased. In this example, the texture of the image is applied to the over-exposed area such that the texture of the image appears in the overexposed area 203 when the overall illumination of the image 201 is decreased.

Figure 6:
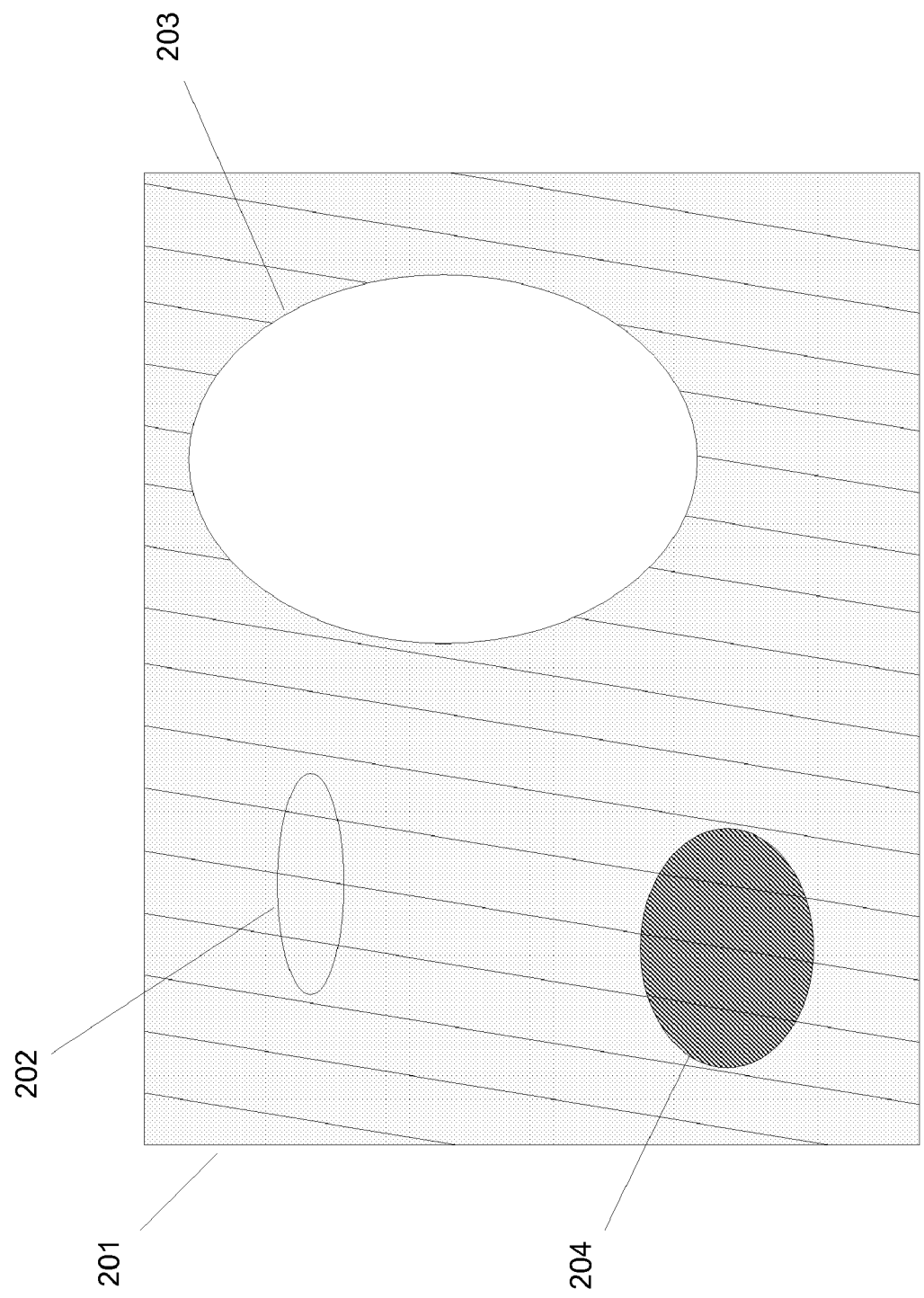
FIG. 6 illustrates an example of an image containing an underexposed area.

Similarly, the texture of the image may be applied to underexposed areas of the image. FIG. 6 illustrates an example of an image 201 containing an underexposed area 204. In this example, the texture of the image is applied to the underexposed area 204 such that when the illumination of the image 201 is increased as illustrated in FIG. 6, the texture may be displayed in the over-exposed area 204. The texture may be applied to the over-exposed area 204 from another portion of the image, for example, region 202 of the image where the exposure of the image is intermediate.

Any of the regions or portions of the image may contain different illumination properties. A first region or a second region of an image may contain a texture. However, in the first region, the image may have a first illumination level while the image in the second region may have a second illumination level that is lower than the first illumination level. The first region may be over-exposed such that a texture associated with the image in the first region may not be clearly visible or may be missing altogether. The second region may also display the texture of the image and may further be exposed at an intermediate level such that the texture is substantially clear. Hence, the first and second region may both contain the texture but the texture may not be clearly visible in the first region because the first region is overexposed in this example. Alternatively, the texture may not be present at all in the first region due to the overexposed nature of the first region.

In this example, the texture from the second region may be applied to the first region of the image while the illumination of the first region is maintained. Hence, the illumination of the second region is not applied to the first region when the texture from the second region is applied to the first region. In one example, the image is decomposed into a low frequency component and a high frequency component. Each of the components may be hallucinated individually. The hallucinated components may be combined to form a hallucinated resultant image. The hallucinated resultant image may include texture information in underexposed areas of the image or overexposed areas of the image, for example.

Figure 7:
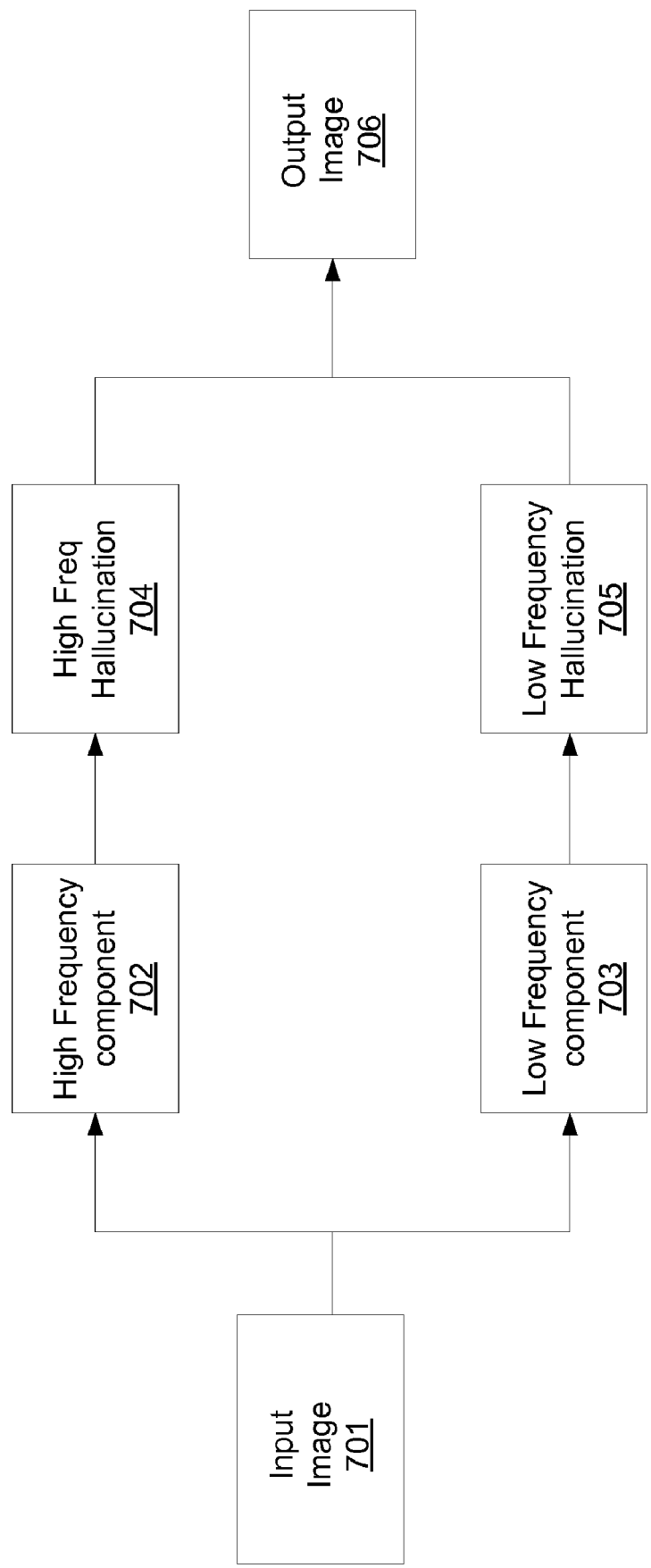
FIG. 7 is a block diagram illustrating one example of hallucination of an image.

FIG. 7 is a block diagram illustrating one example of hallucination of an image. In this example, an input image 701 is received and separated into two components, a high frequency component 702 and a low frequency component 703. The high frequency component 702 may include, for example, high frequency texture information of the image. The high frequency texture information may be hallucinated to generate a high frequency hallucination 704 in a number of ways. For example, the high frequency texture component may be hallucinated via constrained synthesis.

The input image 701 may also be separated into a low frequency component 703. The low frequency component 703 may include, for example, a low frequency illumination component of the image. The low frequency component 703 may further be hallucinated into a low frequency hallucination 705. The hallucination may be accomplished in a variety of ways. In one example, elliptical Gaussian fitting may be applied to the low frequency component 703 to generate the low frequency hallucination 705. The high frequency hallucination 704 and the low frequency hallucination 705 may be combined or blended to form the output image 706. In this example, the output image 706 may contain high dynamic range details in certain areas as compared to the original input image 701. For example, the input image 701 may include overexposed or underexposed areas in which texture information is diminished or lacking. The output image 706 may contain texture information in any of these areas that is greater than that present in the corresponding areas of the input image 701.

Figure 8:
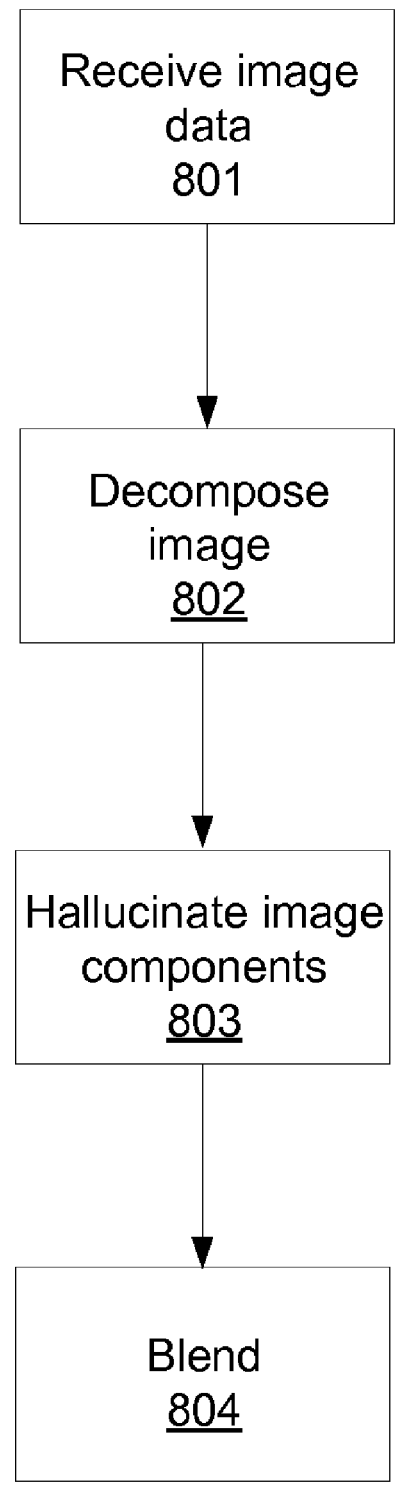
FIG. 8 is a flowchart illustrating an example of hallucinating components of an image for generating high dynamic range details.

FIG. 8 is a flowchart illustrating an example of hallucinating components of an image for generating high dynamic range details. In STEP 801, image data is received. The image received may contain any number of regions of differing characteristics. For example, one region may have an overexposed region, another region may have an underexposed region while yet another region may contain the image at an intermediate exposure level. The image received may further contain a texture. The texture may have varying visibility in different regions or areas of the image depending on any number of factors. For example, in an overexposed or an underexposed region, the texture may have diminished visibility or may lack visibility. In this case, the texture may not be visible in such areas.

In STEP 802, the image received may be decomposed into any number of components. In one example, the image received may be decomposed into at least two components—a high frequency component and a low frequency component. Each of the components may be hallucinated into different hallucinated components (STEP 803) and combined or blended to form a resultant image (STEP 804). The resultant image may include additional high dynamic range detail. For example, the additional high dynamic range detail may be present in the areas of the original image received that were overexposed or underexposed.

Figure 9:
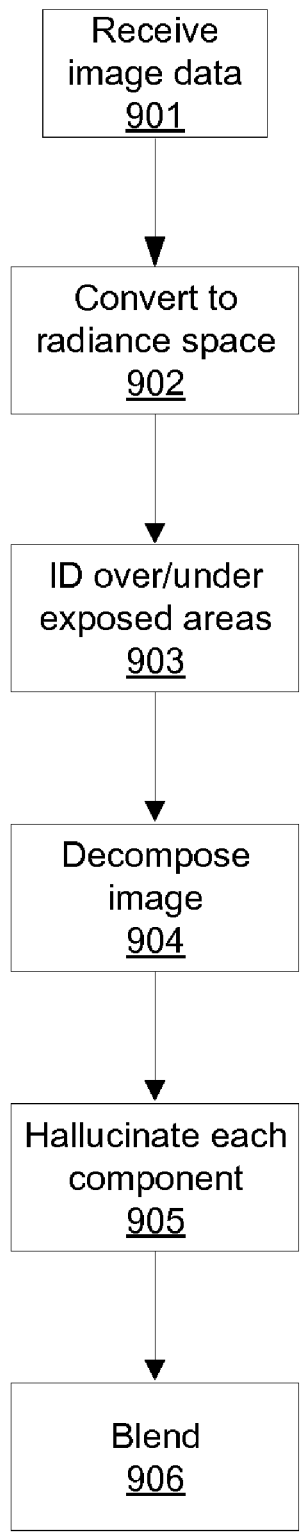
FIG. 9 is a flowchart illustrating another example of hallucinating components of an image.

FIG. 9 is a flowchart illustrating another example of hallucinating components of an image. In STEP 901, an input image is received. The input image may be converted into radiance space (STEP 902). In this example, the input image may be represented as $I_{ldr}$.

Additionally or alternatively, a low density range input image may be converted into radiance space from a calibrated camera curve (e.g., f(x)). In this case, the input image may be represented as follows:

$$I=f(I_{ldr})$$

In addition, the camera curve f(x) may be recovered via sampling multiple images from the same camera. Alternatively, the camera curve may be estimated from a distribution of luminance on edges of the image. For example, if information from multiple images from the same camera is not available, the camera curve may be estimated from the distribution of luminance as described.

In STEP 903, under or overexposed regions may be identified. In one example, pixels in the image received are identified and are further analyzed for luminance levels. The luminance levels for each of the pixels may be compared to the luminance levels for other pixels to generate a relative luminance of the pixels. A predetermined threshold may be identified for luminance of the pixels such that the relative luminance of the pixels may be compared with the predetermined threshold or thresholds to determine under or overexposed regions of the image. For example, if a relative luminance level of a particular pixel in the image is below a predetermined threshold corresponding to an underexposed region, then the pixel may be identified as a pixel within an underexposed region of the image. Conversely, if a relative luminance level of a particular pixel in the image is above a predetermined threshold corresponding to an overexposed region, then the pixel may be identified as a pixel within an overexposed region of the image. Thus, in STEP 903, under-exposed areas or over-exposed areas of the image may be identified.

In addition, a denoising pass may be performed in certain areas or regions of the image. For example, a denoising pass may be performed in areas of the image that are identified as under-exposed. The denoising pass may, for example, reduce or eliminate noise from the designated areas. In this way, noise data may be separated from other data, such as texture data.

The image may further be decomposed into any number of parts or components (STEP 904). For example, the image may include a low density range (LDR) image which may also be within a subset of a high density range (HDR) radiance space. The LDR image may be separated into a low frequency component (e.g., a low frequency illumination component) and a high frequency component (e.g., a high frequency texture component). Separation of the image into components may be accomplished in a variety of ways. For example, bilateral filtering may be performed on the image I to produce a low frequency layer $L_I$.

Where I represents the LDR image and $L_I$ represents the low frequency layer corresponding to the image. Also, a high frequency layer may be generated. In one example, the high frequency layer is generated according to the following: $H_I=I/L_I$ Where $H_I$ represents the high frequency layer, I represents the image, and $L_I$ represents the low frequency layer.

In STEP 905, each of the components is hallucinated independently. In one example, the image is separated into multiple components where one of the components includes an illumination component that provides illumination information. In this example, the illumination component may be estimated during hallucination of the image via interpolation from a linear combination of elliptical Gaussian kernels. Also, hallucination of the illumination component may be accomplished automatically or may be adjusted interactively by a user as desired.

Also, the image may be separated into multiple components where one or more of the component includes a texture component that provides texture information of the image. In hallucinating the texture component (STEP 905), certain regions or areas of the image (e.g., over or under exposed areas), may be filled in via constrained texture synthesis. Constrained texture synthesis may be accomplished by receiving a stroke or other indication from a user indicating a selection of a source for providing texture information for the texture component in texture synthesis. The selected source region may further be segmented in any variety of ways. For example, the selected source region may be segmented automatically via a graph cut based method in lazy snapping as would be understood by one of skill in the art.

In one example, a penalty for pixel differences may be identified for each pixel. A conservative area within texture boundaries may further be identified based on the penalty for pixel different. For example, the penalty for pixel differences may be increased in areas corresponding to conservative areas within texture boundaries. In addition, increasing the penalties for pixel different within the conservative areas in texture boundaries may be accomplished automatically. Constrained texture synthesis may be applied to the selected regions to hallucinate the regions (STEP 905). Hallucinating the regions may be accomplished in a variety of ways. For example, a K-coherence based constrained optimization process for interactive synthesis may be applied to hallucinate the target regions.

In STEP 906, hallucinated components may be blended or combined to form a resultant high dynamic range detailed image. In this example, the hallucinated high frequency texture component may be combined or blended with the hallucinated low frequency illumination map to produce the hallucinated high dynamic range detailed image. Blending may be accomplished in a variety of ways. For example, blending may include Poisson editing. In another example, blending includes smoothing out the transition between hallucinated areas and the original image.

In another example, additional characteristics of the image may be included in the generation of high dynamic range detailed images. For example, a portion of an image may include higher levels of image details or characteristics. Examples of such characteristics include perspective information or structure information. In this case, a target region is identified within the image or from any source (e.g., external source or the image itself). The selected target region may be further modified as desired. The modification of the selected target region may include any desired modification such as but not limited to stroke-based image warping. In this example, a selection of an area may be received, the selected target region is repaired via stroke-based image warping, and the repaired image portion may be applied to another selected region of the image.

Figure 10:
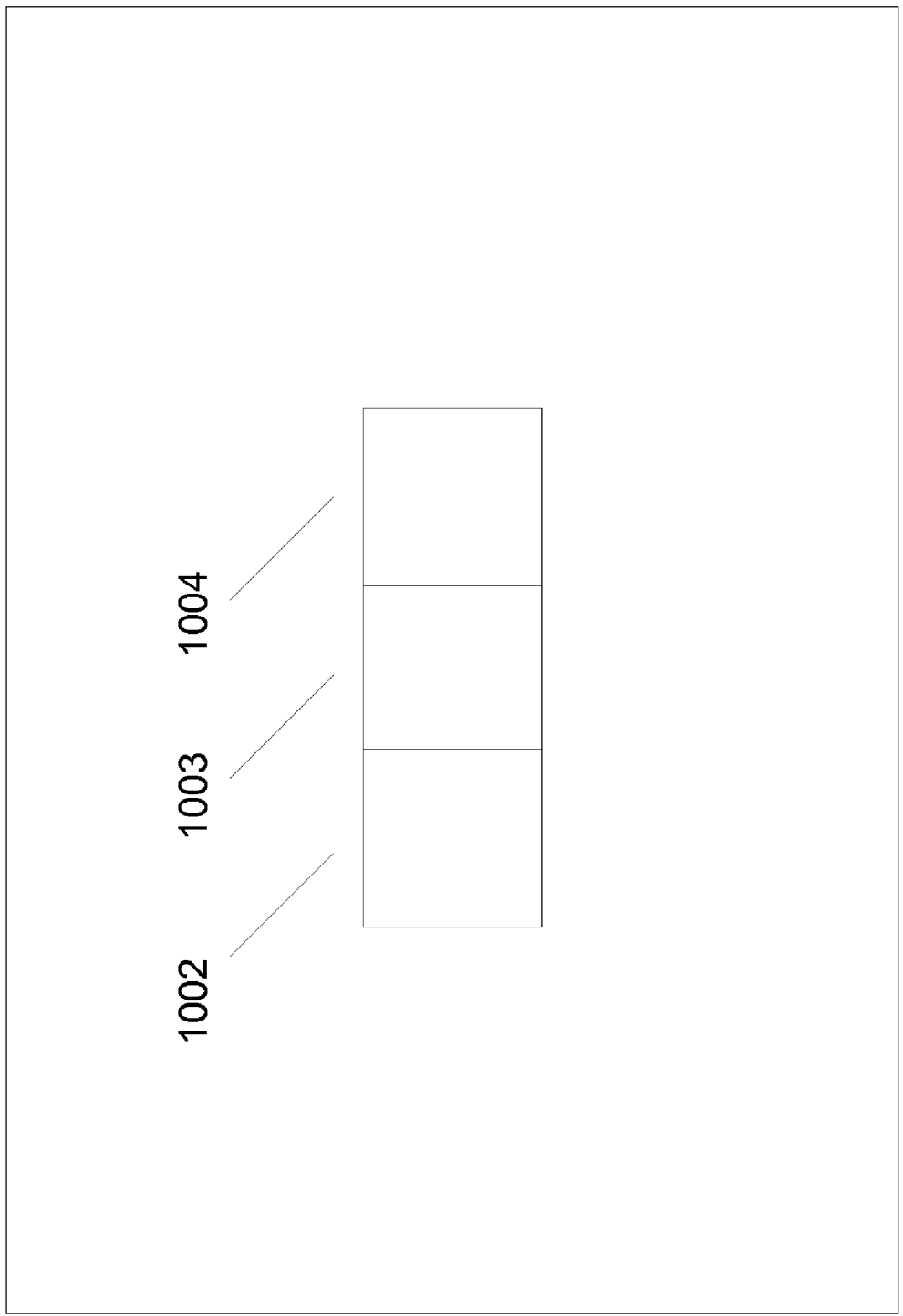
FIG. 10 illustrates an example of a user interface for providing tools for creating a high dynamic range detailed image.

FIG. 10 illustrates an example of a user interface for providing tools for creating a high dynamic range detailed image. In this example. A user interface 1001 may include any number of tools. In this illustrated example, the user interface 1001 includes three selections representing different available tools, however, any number may be provided. As FIG. 10 illustrates, the user interface 1001 includes a first tool 1002 for providing texture to a selected region of an image. In this example, the first tool 1002 may receive an input (e.g., from a user). Responsive to receiving the input at the first tool 1002, the system may further receive an indication of an area of an image as a source for texture information. Also, a second area of the image may be indicated for receiving the source information (e.g., texture information) from the first area of the image.

The user interface 1001 may further include a second tool 1003 for providing warping functionality. For example, the second tool 1003 may receive an input (e.g., from a user). Responsive to receiving the input at the second tool 1003, the system may further receive an indication of a target region in an image as a source of texture information. Different characteristics of the selected target region may be applied to a second region of the image. For example, any of texture information, perspective information, structure information, etc. from the selected target region may be applied to the second region of the image. Also, at least one characteristic of the selected target region may not be applied to the second region of the image. For example, illumination information or any other desired information from the selected target region may not be applied to the second region of the image.

The user interface 1001 may further include a third tool 1004 for providing illumination functionality. In this example, a third tool 1004 may receive an input (e.g., from a user). Responsive to receiving the input at the third tool 1004, the system may further receiving an indication of a region in an image to be illuminated. The region to be illuminated may generate and/or display illumination data in which illumination effects may be applied to a desired region or area within an image. The third tool 1004 may be used for fine tune illuminations, the fine tune illuminations being determined and generated by an automatic fitting algorithm.

It is understood that aspects of the present description can take many forms and embodiments. The embodiments shown herein are intended to illustrate rather than to limit the description, it being appreciated that variations may be made without departing from the spirit of the scope of the invention. Although illustrative embodiments have been shown and described, a wide range of modification, change and substitution is intended in the foregoing disclosure and in some instances some features may be employed without a corresponding use of the other features. Accordingly, it is appropriate that the appended claims be construed broadly and in a manner consistent with the scope of the description.

The invention claimed is:

1. A method of generating an image comprising:
    receiving an input image;
    decomposing the input image into a plurality of components including at least one high frequency component and at least one low frequency component, wherein the at least one high frequency component includes a texture component corresponding to a texture in the input image;
    hallucinating each of the plurality of components such that the at least one high frequency component is hallucinated independently of the at least one low frequency component; and
    generating an output image based on the hallucinated plurality of components.

2. The method of claim 1 further including converting the input image into radiance space from a calibrated camera curve.

3. The method of claim 2 wherein converting the input image includes generating the converted input image I as follows:

$$I = f(I_{Idr})$$

wherein I represents the converted input image, f(x) represents the calibrated camera curve, and $I_{Idr}$ represents the input image.

4. The method of claim 2 wherein converting the input image includes receiving a plurality of images from a camera and recovering the camera curve based on the plurality of images from the camera.

5. The method of claim 2 wherein the input image includes image edges and converting the input image includes estimating the camera curve from a distribution of luminance on the image edges.

6. The method of claim 1 further including identifying a region in the input image, the region being one of over-exposed or under-exposed.

7. The method of claim 6 wherein identifying the region includes determining relative luminance of pixels in the image and determining the region as overexposed or underexposed based on a comparison of the relative luminance of pixels.

8. The method of claim 7 wherein identifying the region further includes identifying an under-exposed region and applying a denoising pass to the identified under-exposed region.

9. The method of claim 1 wherein the at least one low frequency component includes an illumination component corresponding to an illumination level in the input image.

10. The method of claim 1 wherein hallucinating the at least one high frequency component includes identifying at least one of an underexposed or overexposed region in the input image and modifying the at least one of an underexposed or overexposed region in the input image by constrained texture synthesis.

11. The method of claim 10 wherein modifying includes:
receiving an indication of a source region in the input image, the source region including a source region texture;
receiving an indication of a target region; and
performing constrained texture synthesis to generate a hallucinated target region, the hallucinated target region including the source region texture.

12. The method of claim 1 wherein hallucinating the at least one low frequency component includes identifying at least one of an underexposed or overexposed region in the input image and estimating radiance values of the identified region.

13. The method of claim 12 wherein estimating radiance values includes interpolating the identified region from a linear combination of elliptical Gaussian kernels.

14. The method of claim 13 wherein generating the output image includes blending the hallucinated at least one high frequency component and the hallucinated at least one low frequency component to generate the output image.

15. The method of claim 14 wherein the blending includes applying Poisson editing and smoothing a transition between the output image and the input image.

16. A method of generating an image comprising:
receiving an input image, wherein at least a first region of the input image includes a texture and a first illumination that is independent of the texture;
receiving an indication of a second region in the input image, the second region including a second illumination and lacking the texture; and
applying the texture from the first region to the second region to generate an output image, while substantially retaining the second illumination in the second region.

17. The method of claim 16 wherein the second region of the output image includes the texture at the second illumination and the first region of the output image includes the texture at the first illumination.

18. A method of generating an image comprising:
receiving an input image, the input image including a first region at a first illumination level and containing a texture at a first texture level;
identifying a second region in the input image, the second region at a second illumination level and including the texture at a second texture level, the second texture level being less than the first texture level and the second illumination level being different from the first illumination level;
decomposing the input image into a high frequency texture component and a low frequency illumination component;
hallucinating the high frequency texture component by modifying a region corresponding to the second region of the image by constrained texture synthesis;
hallucinating the low frequency illumination component including estimating radiance values in the region corresponding to the second region of the image via interpolating the identified region from a linear combination of elliptical Gaussian kernels;
combining the hallucinated high frequency texture component and the hallucinated low frequency illumination component to create an output image; and
outputting the output image, the output image including a first region corresponding to the first region of the input image and a second region corresponding to the second region of the input image, the second region of the output image at the second illumination level and having the texture at a third texture level, the third texture level being greater than the second texture level.

19. The method of claim 16 wherein the first region includes a representation of a surface having the texture.

20. The method of claim 16 wherein the first illumination is at a first exposure level and wherein the second illumination is at a second exposure level.

* * * * *